US005184781A

United States Patent [19]

Andela

[11] Patent Number: 5,184,781

[45] Date of Patent: Feb. 9, 1993

[54] GLASS PULVERIZER

[76] Inventor: James Andela, R.D. #3, Box 246, Richfield Springs, N.Y. 13439

[21] Appl. No.: 766,832

[22] Filed: Jan. 14, 1992

[51] Int. Cl.[5] ............................................ B02C 13/10

[52] U.S. Cl. ...................................... 241/62; 241/99; 241/188.1; 241/193

[58] Field of Search ................ 241/99, 100, 138, 154, 241/189.1, 193, 194, 62, 188.1

[56] References Cited

U.S. PATENT DOCUMENTS 359,630 3/1887 Pratt .................................... 241/193
1,034,552 8/1912 Williams ......................... 241/193 X
1,433,042 10/1922 Sedberry ......................... 241/154 X
3,037,713 6/1962 Carroll ............................ 241/100 X
3,161,412 12/1964 Ferris ............................. 241/193 X
3,342,426 9/1967 Sackett, Sr. .................... 241/193 X
3,946,953 3/1976 Hato ................................. 241/99 X
4,166,583 9/1979 Ruckstuhl ............................ 241/73
4,172,481 10/1979 Brisson ........................... 241/193 X
4,373,435 2/1983 Grevich ........................... 241/99 X
4,708,294 11/1987 Endom ......................... 241/101.7 X
4,875,630 10/1989 Carlson .......................... 241/193 X
4,889,290 12/1989 Koffsky et al. ................ 241/100 X
5,048,766 9/1991 Gaylor et al. .................. 241/154 X

FOREIGN PATENT DOCUMENTS 1008093 5/1957 Fed. Rep. of Germany .
1020064 5/1983 U.S.S.R. .............................. 241/154
163976 1/1921 United Kingdom ................ 241/154

*Primary Examiner*—Frank T. Yost
*Assistant Examiner*—Clark F. Dexter
*Attorney, Agent, or Firm*—Schmeiser, Morelle & Watts

[57] ABSTRACT

The invention is a glass pulverizer in which two rotatable chain-type flail assemblies are housed within two contiguous, internally joined drum-like housings. One housing has an inlet on one end and the other housing has an outlet located on an end furthest from the end adjacent the inlet. The housing having an outlet is longer than the other housing thereby allowing the pulverized glass to exit the device in a relatively low speed and controlled manner. A flail mounting method is also taught in which at least one chain flail assembly is comprised of a plurality of individual chains that are mounted to a connecting chain that is spirally wrapped about the assembly's central shaft and is designed to be easily removable from the shaft.

13 Claims, 2 Drawing Sheets

GLASS PULVERIZER

FIELD OF THE INVENTION

The invention is in the field of apparatus for comminuting materials. More specifically, the invention is a glass pulverizer that employs two drum-shaped housings oriented in a side-by-side contiguous fashion. Within each housing is a rotatable chain flail assembly comprising a central rotor to which a plurality of chains is attached in a spiral configuration.

BACKGROUND OF THE INVENTION

Numerous machines have been developed specifically for comminuting empty glass containers. Breaking the containers up into fragments facilitates the recycling or disposal of the glass material. Machines developed for this purpose typically include an inlet opening through which the glass containers are inserted and an outlet opening through which the broken glass fragments and glass dust are ejected. To accomplish the breaking of the glass, these machines usually employ either a crushing apparatus or a hammermill type of breaker apparatus.

The problem with prior art machines that employ a crusher-type apparatus is their susceptibility to jamming when metal or paper is inadvertently dropped into the machine's inlet. To overcome this common occurrence the machines will either have the ability to crush the metal, or the machines will include an automatic dump apparatus that allows the machine to purge its contents when the anvil of the crushing mechanism meets an unusual resistance. Both of these solutions add an undesirable measure of complexity and expense to the device.

In machines that employ an internal breaker type apparatus, frequent and expensive maintenance is often required. These machines typically make use of a hammermill to break the glass. The hammermill is usually comprised of a number of rigid metal "hammers" that are mounted on the exterior surface of a central rotatable shaft. Each hammer must be sharp and straight for the machine to operate efficiently. However, during use the individual hammers rapidly become dulled. When metal objects are inadvertently fed into the device, the metal bends or breaks individual hammers thereby requiring their replacement.

One modification that has been used somewhat successfully in overcoming the failings of the prior art hammermills is the use of flexible hammers in lieu of rigid hammers. The flexible hammers are often in the form of movable chains that are attached to the machine's central shaft in a side-by-side orientation. The chains break the glass and allow any metal fragments or metal containers to rapidly pass through the device without causing any damage.

The known chain-type flexible hammermills, while providing a number of advantages over the prior art rigid hammermills, still suffer a number of failings. Firstly, the degree of comminution is uncontrolled, and as a result relatively large diameter fragments of glass are often ejected from the device's outlet. Since the outputted material includes these large glass fragments mixed with the smaller glass particles, the material cannot be easily recycled where it is mixed with asphalt or similar materials and used in road construction. Therefore, the large fragments must be separated from the smaller particles and removed from the product. Once done, the large fragments can be reentered into the machine and made smaller. While possible, this adds an unwanted additional step to the recycling process.

A second problem with prior art chain-type hammermills is that the layout of the device normally necessitates a gravity or blower induced flow of material through the device in order to prevent the material from clogging the unit. As a result, a large foundation is often required and when a blower is used, a significant increase in operating and maintenance costs is produced.

A third problem with prior art devices of this type is that the flowpath of the material within the machine is inefficient and uncontrolled. This results in high speed and only partially broken material being violently ejected from the device's outlet. This high speed material can be dangerous and can damage whatever container is being used to receive the broken glass.

Lastly, the present methods of fastening the chain type of hammer to the rotatable shaft make the chains difficult and time consuming to remove. Since the chains can become worn or broken during use, this presents a maintenance problem exacerbated by sharp glass particles and fragments that have become lodged against the retaining fasteners.

SUMMARY OF THE INVENTION

The invention is a glass pulverizer that employs two parallel chain flail assemblies housed within a pair of contiguous drum-shaped housings. The first housing additionally includes a top mounted feed inlet. The first chain flail assembly comprises a rotatable shaft oriented along the housing's longitudinal axis. Each of the housings include a side opening that extends along the area where they are joined together. The two openings form a conduit between the housings and allow the initially broken glass to pass back an forth between the two chain flail assemblies.

Each of the two housings are supported on a common foundation and are parallel to each other. The two chain flail assemblies are also oriented in a parallel manner and each passes approximately through the longitudinal axis of its associated housing. The two housings are identical in diameter but have distinctly different lengths. The second housing extends outwardly past the first housing and it is in the bottom of the outwardly extending portion in which the device's outlet is located.

Located on the rotatable shaft of each chain flail assembly are a plurality of separate multi-link chain flails. The flails are oriented on the shaft in a spiral fashion so that when the shaft is spinning, the flails extend away from the shaft and assume a spiral shape about the shaft. The spiral orientation causes the assemblies to also function as an auger to move the broken glass through the device in the direction of the outlet. In one embodiment of the invention, each flail assembly has its individual chain flails attached in a staggered order to a mounting chain that is spirally wrapped about the rotatable shaft. The mounting chain itself is removably fastened at each end to the shaft. The chains can individually be removed from the common mounting chain for servicing or, to facilitate the servicing of the entire chain flail assembly, the mounting chain and the attached flails can be quickly and easily removed as a single unit from the shaft by just releasing the fasteners located at each end of the mounting chain.

The layout of the device is uniquely adapted to control the through-flow and degree of pulverization of the glass. When the glass initially enters the first housing, it is rapidly broken into large pieces by the first chain flail assembly. The glass fragments are then directed into an "impact zone" located in the area where the two housings are joined. In this area, the glass bounces back and forth between the first and second chain assemblies until the fragments have been reduced in size to a small predetermined diameter such as 0.1 millimeter. At the same time, it is drawn by the auger-type action of the flail assemblies toward the outer end of the device and eventually to the extreme outer end of the second housing where it enters the outlet. By the time the fragments reach the outlet, they have been pulverized to the extent required and are moving at a relatively low speed and in a controlled fashion. They then move through the outlet and fall into a collector placed below the device.

The invention also optionally includes a water spray unit that directs a stream of water onto the glass as it enters the first housing and is initially broken. The water does not adversely affect the comminution process and functions to reduce the incidence of airborne glass dust that would otherwise be produced by the unit.

To rotate the chain flail assemblies, a single motor is connected to both rotatable shafts via a belt and pulley system. The belts and pulleys are arranged so that both shafts and therefore both chain flail assemblies spin in the same direction.

Due to the design of the device, it does not significantly require gravity or blowers to move the pulverized glass through the unit. This allows the user to dispense with the significant structure normally required to support the unit and to avoid the cost of devices dedicated to the moving of the glass.

DETAILED DESCRIPTION OF THE DRAWINGS

Figure 3:
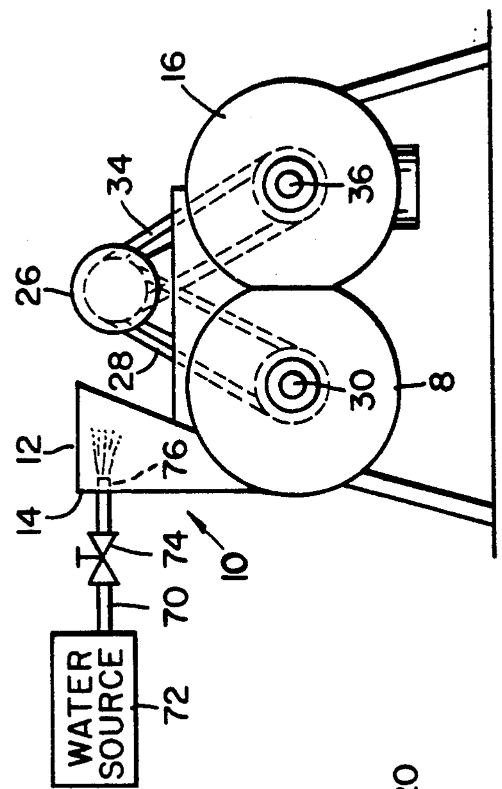
FIG. 3 is an end view of the invention shown in FIG. 1. A liquid spray system that can optionally be added to the invention is also shown in this figure.

Referring now to the drawings in greater detail, wherein like reference characters refer to like parts throughout the several FIGS., there is shown by the numeral 1 a glass pulverizer unit. The unit includes a support framework 2 upon which the pulverizer apparatus 6 rests.

Figure 2:
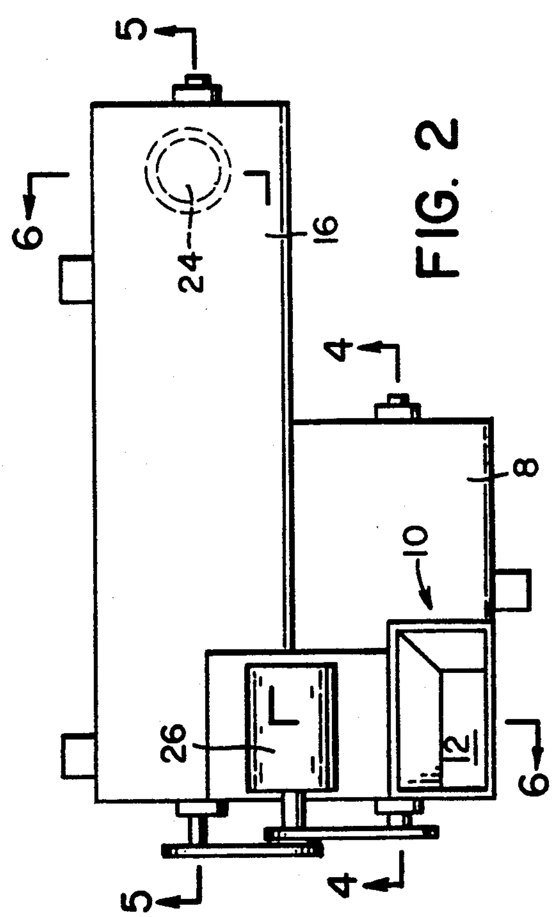
FIG. 2 is a plan view of the invention shown in FIG. 1.
Figure 1:
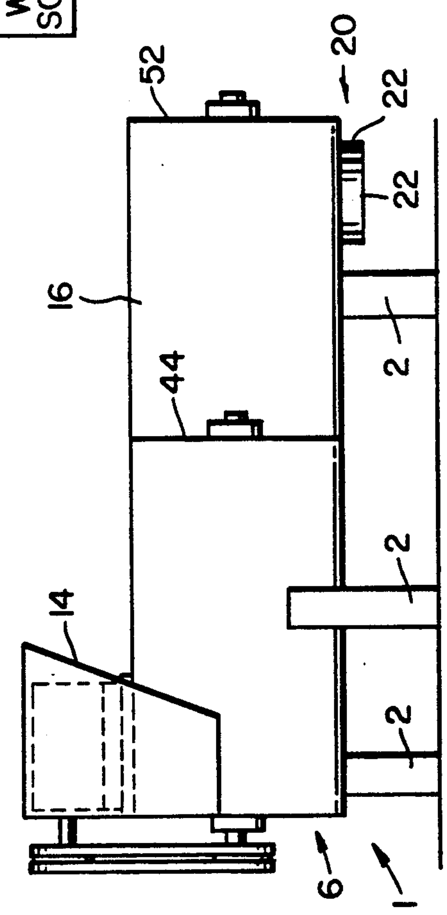
FIG. 1 is an elevational view of the invention.

As can be seen in FIGS. 1 and 2, the pulverizer apparatus comprises a first cylindrical drum-like housing 8 that includes a top mounted inlet structure 10. The inlet structure includes a central opening 12 that is surrounded by a funnel shaped-wall structure 14. Contiguous to the first drum-shaped housing 8 is a second cylindrical drum-shaped housing 16.

The second housing 16 is oriented in a longitudinally parallel manner to the first housing and includes an outlet structure 20. The outlet includes a circular wall structure 22 that surrounds a central opening 24.

FIG. 3 provides an end view of the apparatus in which the unit's drive mechanism can be seen. The drive mechanism includes a top mounted motor 26 that is connected by a first belt 28 to an end 30 of a rotatable shaft 32. A second belt 34 connects the motor to the end 36 of a second shaft 38. When the motor is operating, the belts cause both shafts 32 and 38 to turn in the same direction.

Figure 4:
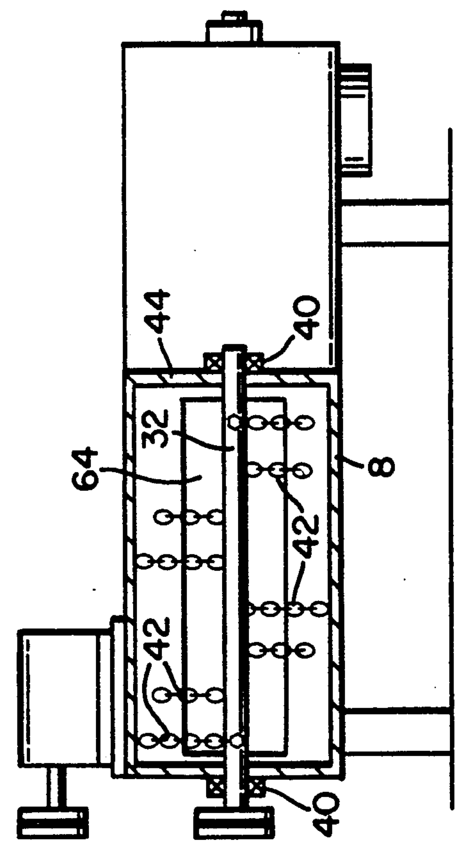
FIG. 4 is a partially cross-sectioned elevational view of the invention of FIG. 1 taken through the first housing.

FIG. 4 provides a cross-sectional view of the device taken through the longitudinal centerline of the first housing 8. In this view, the internal configuration of the first housing can be seen. Within the housing is a chain flail assembly comprising a center shaft 32 located proximate the housing's longitudinal axis and supported at each end by bearings 40 that are secured to the housing. The assembly also includes a plurality of multi-link chain flails 42 that are each removably attached to shaft 32 by standard removable fasteners such as bolts (not shown). Each chain flail is attached to the shaft in a manner where it is spaced from any adjacent flails by both a vertical and horizontal distance. The flails are oriented so that when the shaft is rotating, the centrifugal force causes the flails to extend outwardly and form a spiral/auger shape. This shape performs two functions. Firstly, it causes an effective and controlled comminution of the inputted glass containers and/or glass fragments. Secondly, it causes the glass to move toward an outer end 44 of the housing in a direction parallel to the housing's longitudinal axis.

Figure 5:
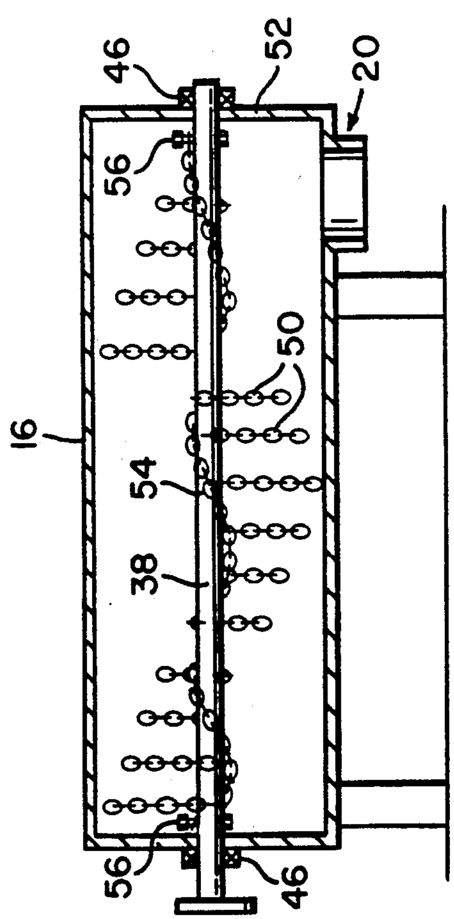
FIG. 5 is a cross-section elevational view of the invention shown in FIG. 1 taken through the second housing.

FIG. 5 provides a cross-sectional view of the device taken through the centerline of the second housing 16. In this view, one can see that a chain flail assembly is also located within the second housing 16. This assembly includes a rotatable shaft 38 supported by bearings 46 that are fixed to the housing and located proximate each end of the shaft. Each of a plurality of multi-link chain flails 50 may be removably attached to shaft 38 in the same spiral orientation as used on the chain flail assembly located within the first housing 8. When shaft 38 is spinning, the chain flails assume the spiral shape shown and effectively break apart the glass fragments and moves the pulverized glass in auger fashion toward the outlet 20 that is located on the outer end 52 of housing 16.

FIG. 5 shows an alternative embodiment of a flail mounting apparatus that greatly facilitates the maintenance of the device. A long mounting/connecting chain 54 is wrapped about the shaft 38 in a spiral fashion. Each of the individual chain flails is removably attached at one end to the mounting chain by standard removable fasteners such as nuts and bolts (not shown). The mounting chain itself is attached at each end to an end of the shaft using a standard removable fastener 56 such as a bolt. This allows the chains of the flail assembly to be quickly and easily removed from the shaft by merely removing the fasteners located at each end of the mounting chain. The user then unwraps the mounting chain from the shaft and in one step is able to remove the mounting chain and all the attached individual chain flails from the housing. The user can then perform maintenance on all of the chain flails at a convenient location at the same time. This avoids the necessity of the user having to spend long periods of time working within the housing trying to free a multitude of attachment fasteners and at the same time having to periodically rotate the shaft to get at the base of each individual chain flail. In addition, each flail preferably includes a removable outer link so that the outer link can be easily replaced if it becomes worn due to the abrasion normally experienced with this type of device. It should be noted that even though the drawings show only one shaft having the chain flails attached in this manner using a long mounting chain, this attachment method can easily be used on both shafts 32 and 38 to fasten the associated flails of each assembly to their associated shaft.

The individual flails 42 and 50 are in the form of multi-link chains. The innermost link is secured to the shaft or connecting chain by a removable fastener. The outer link of each flail is normally made from case hardened steel and is circular in shape. The round shape allows the link to turn during use and thereby to wear evenly about its perimeter. As previously noted, the outer link(s) of the flails can also include a standard type of removable link having a movable or detachable portion that allows the link(s) to be easily detachable from the inner links.

Figure 6:
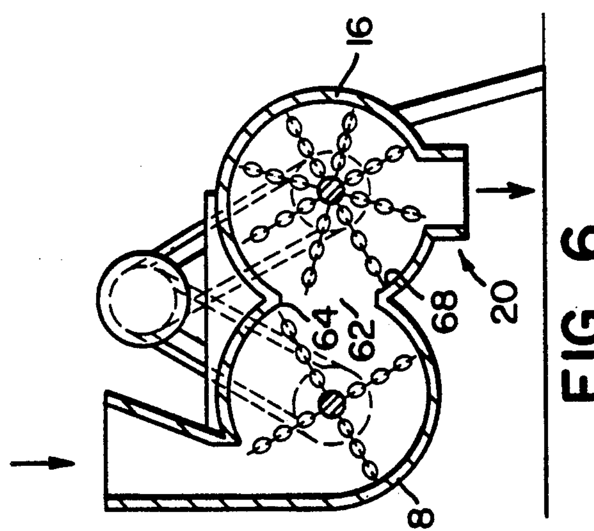
FIG. 6 is a cross-sectional end view of the invention shown in FIG. 1 taken at a point proximate the end of the housings shown in FIG. 3.

FIG. 6 provides a cross-sectional view taken across the width of the device. In this view, the shafts and individual flails can be seen as well as a contact zone 62 located between the two housings. Housing 8 has a long basically rectangular opening 64 located in its side. The opening is contiguous to a similarly shaped opening 68 in the side of housing 16. These two openings join the interior of the two housings together and allow glass fragments to bounce between and be impacted by the chain flails of each of the two flail assemblies. This causes the glass fragments to become completely pulverized as they move toward the outer ends of the housings under the auger type action of the flail assemblies. When the glass reaches the outer end 44 of the shorter housing 8, it bounces into the longer housing 16 where it is moved in a controlled manner by the flail assembly of housing 16 to the outer end 52 of the housing. Once the now fully pulverized glass reaches the outlet 20, it falls through the outlet's center hole into a removable container or drum (not shown).

To aid in reducing the amount of airborne glass particles that are sometimes released from the device, a water spray system may optionally be included. The spray system is shown only in FIG. 3 wherein a hose or pipe 70 is connected to a source of water 72. A valve 74 is located in the hose adjacent the unit and functions to control the volume of water passing through the hose. Attached to the outlet of the valve and mounted to the side of the device's inlet 10 is a spray nozzle 76. The nozzle functions to allow a fine spray of liquid to be released into the inlet and thereby wet the glass containers as they are inserted into the device. This wetting action causes the fine glass particles to adhere to larger glass fragments and thereby to follow the larger glass particles toward the device's outlet 20. The nature and operation of the flail units is for the most part unaffected by the added liquid.

To summarize the operation of the unit, the user inputs glass containers through the inlet 10. The falling containers are initially broken as they contact the chain flails that are moving below the inlet. The broken glass fragments are then swept by the flails into the impact zone between the two housings. The fragments then bounce back and forth between the individual flails of the two flail assemblies and thereby become fully comminuted and reach a size of as little as 1 millimeter in diameter. At the same time, the auger effect of the flail assemblies causes the glass particles to move toward the outer ends of each housing. When the particles reach the outer end 44 of the shorter housing 8, they are swept into the flails of the longer housing where they are then propelled in a controlled fashion toward the outlet 20. They then fall through the outlet's center hole into a removable drum or similar container (not shown).

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. An improved glass pulverizer of the type having a first hollow housing, an inlet means leading to the interior of the first housing, an outlet means operatively located in said first housing, a first rotatable chain-type flail assembly located within said first housing wherein said flail assembly comprises a first rotatable shaft means and a first plurality of multi-link chain flails that are mounted at one end to said first shaft means, a rotator means connected to said first shaft means to rotate said first shaft means and wherein the improvement comprises:

a second hollow housing operatively connected to the first housing and having a second rotatable chain-type flail assembly located within its interior, said second flail assembly comprising a second rotatably shaft means with a second flail assembly of multi-link chain flails attached to said second shaft means and wherein the rotator means is connected to said second shaft means to rotate said second shaft means;

wherein the outlet means of said first housing is a side opening, said second housing also having a side opening and wherein said side openings are connected to each other in a manner that allows material to travel back and forth between said housings via the side openings; and wherein the first and second housings have an elongated cylindrical shape and wherein said second housing is longer than said first housing and therefore has a portion that extends past an end of the first housing and wherein an outlet means of the pulverizer is located on said extending portion proximate an end of said extending portion.

2. The pulverizer of claim 1 wherein said side openings are contiguous.

3. The pulverizer of claim 1 wherein the individual flails of each flail assembly are removably mounted on the associated shaft means and oriented in a spiral configuration about the associated shaft means whereby when the shaft means is spinning, the flails assume a spiral shape and function in a manner similar to an auger to thereby move broken material within the associated housing toward an end of the associated housing.

4. The pulverizer of claim 3 wherein at least one of said shaft means includes a shaft and a mounting chain that is spirally wrapped about the shaft and is removably fastened at each end to the shaft and wherein the individual chain flails of the associated flail assembly are removably fastened at one end to the mounting chain and are thereby secured to the associated shaft.

5. The pulverizer of claim 1 wherein the rotator means that is connected to the shaft means of each of the chain flail assemblies causes said shaft means to rotate in the same direction.

6. The pulverizer of claim 5 wherein the rotator means that is connected to the shaft means of each of the chain flail assemblies comprises a single motor connected to each of the shaft means by a belt and pulley system.

7. The pulverizer of claim 1 further comprising a liquid spray means attached to said inlet means that functions to wet any glass materials that are passing through the inlet.

8. The pulverizer of claim 1 wherein each of the chain flails have a first end and a second end wherein they are secured to their associated shaft means at their first end and a plurality of said flails have at least one detachable link forming their second end.

9. A glass pulverizing apparatus comprising:

a first drum-shaped hollow housing having a first end, a second end and a side opening;

a second drum-shaped hollow housing having a first end, a second end and a side opening;

a first chain-type flail assembly operatively mounted within said first housing;

a second chain-type flail assembly operatively mounted within said second housing;

a motor means operatively connected to said first and second chain flail assemblies wherein said motor means functions to cause said flail assemblies to rotate;

an inlet located proximate a first end of said first housing wherein said inlet functions to allow glass material to enter an interior area of said first housing;

an outlet located proximate a second end of said second housing wherein said outlet functions to allow glass material to exit from an interior area of said second housing;

wherein said first and second housings are contiguous and each have a longitudinal axis;

wherein said housings are oriented so that their longitudinal axes are substantially parallel and the first end of the first housing is adjacent the first end of the second housing;

wherein the side openings in each of said housings are connected to thereby allow material to travel between the interior areas of the first and second housings; and wherein the second housing is longer than the first housing with the second end of the second housing extending outwardly past the second end of the first housing to thereby provide an area adjacent said outlet that causes any moving glass pieces proximate the outlet to become uniform in speed and direction prior to passing through the outlet.

10. The apparatus of claim 9 wherein each of said flail assemblies comprise a central rotatable shaft with a plurality of individual chain flails removably mounted to said shaft.

11. The apparatus of claim 10 wherein said motor means is connected to each of said central shafts of the flail assemblies and wherein rotation of the motor means causes the shafts of the flail assemblies to rotate in the same direction.

12. The apparatus of claim 10 wherein each of the individual chain flails of at least one of said flail assemblies is attached at one end to a mounting chain that is spirally wrapped about the shaft of said at least one chain flail assembly and wherein fastening means are located at each end of said mounting chain to fasten said chain to said shaft.

13. The apparatus of claim 9 further comprising a liquid spray means attached to said inlet and functioning to wet any glass materials that are passing through the inlet.

* * * * *